Patented Dec. 28, 1937

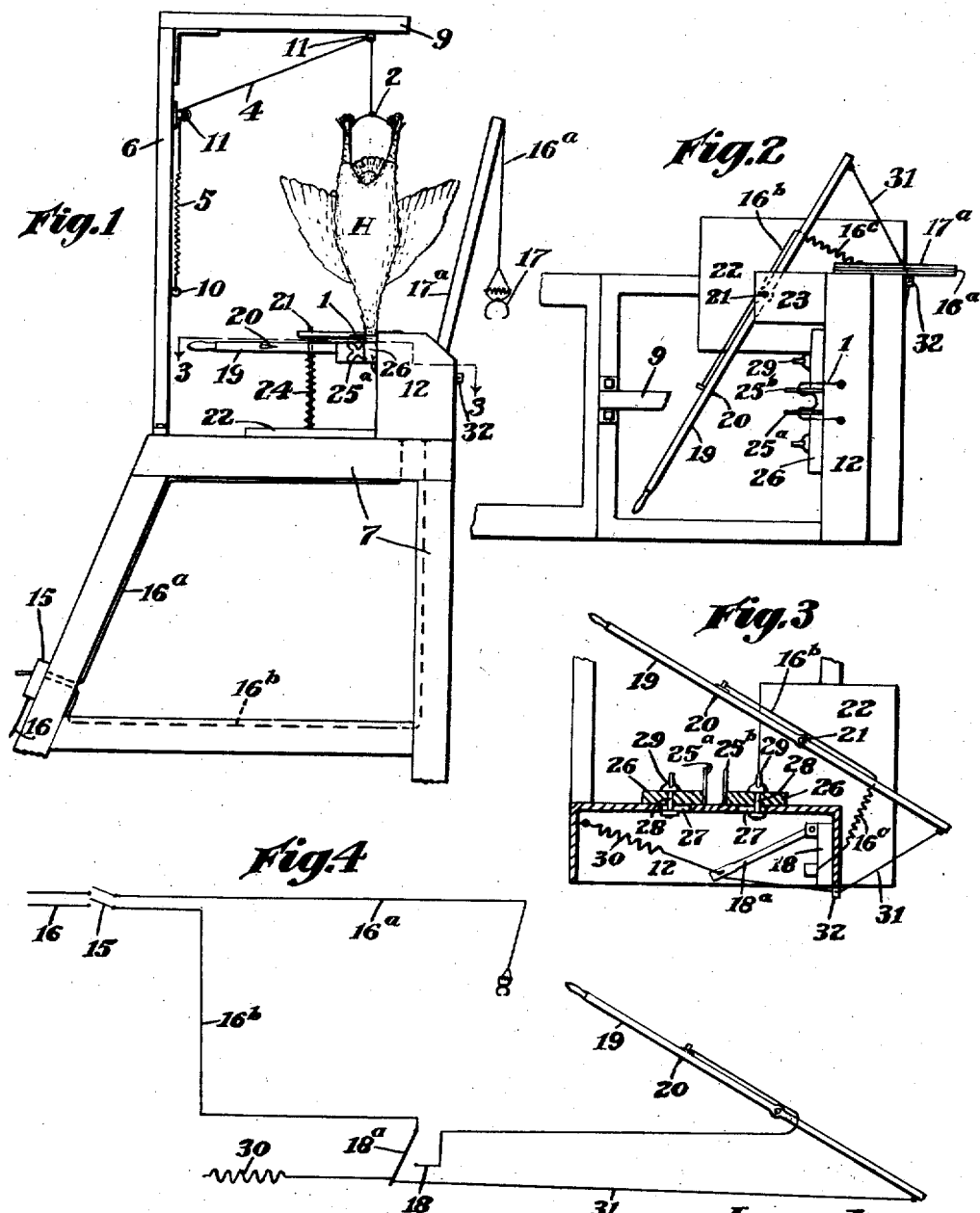

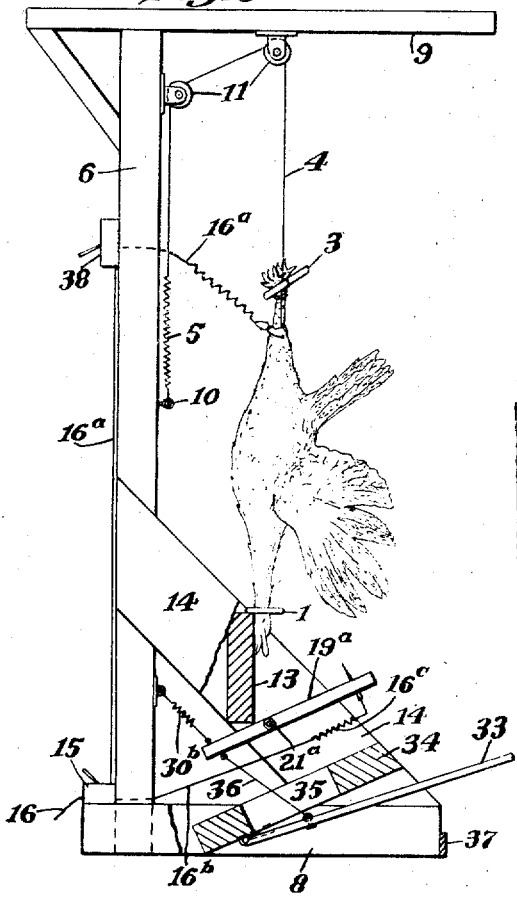

2,103,288

UNITED STATES PATENT OFFICE 2,103,288

METHOD AND APPARATUS FOR KILLING POULTRY

Wilber V. Hunt, North Acton, Mass.

Application December 19, 1935, Serial No. 55,243

31 Claims. (Cl. 17—11)

My present invention relates to improvements in methods and apparatus for use in the preparation of all kinds of poultry for the market.

Many of the problems involved in the killing of poultry, particularly in quantity, are serious and although of varied effect, they have a common origin in the faulty preparation of the poultry for bleeding.

In order that the advantages resulting from my invention may be fully appreciated, it is necessary to consider the nervous system of poultry before the common practices may be reviewed. Briefly, the principal nerve centers of poultry are at the brain, the brachial plexus and the sacral plexus which centers are more or less independent of each other.

The most widely accepted practice recognizes the brain center as important in facilitating plucking. This practice consists of two distinct operations, requiring as it does the cutting of the jugular vein and the piercing of the brain through the roof of the mouth.

While this practice has real advantages, the cutting of the vein through the mouth of the bird after it has been forced open is difficult. The vein, to secure proper bleeding, must be cut below forks and improper bleeding results in an unsightly appearance of the bird and more rapid deterioration. For these reasons, it is frequently cut through the neck where it is more accessible.

The principal objection to these practices is that even if the brain is properly pierced, the bleeding period is characterized by strong muscular reactions of the wings and legs, particularly of the wings, which frequently result in a bruised condition and broken bones impairing the value of the dressed poultry. Torn flesh, a consequence of feather holding muscles remaining contracted, was a further objectionable condition and the uncontrollable flopping of the bird during bleeding, made a messy condition unavoidable.

To overcome this wing breakage attempts were made to provide structure in which the birds could be held for the minute and one-half or two minutes necessary for complete bleeding, although larger birds so far as I know were manually held. These attempts were neither successful nor satisfactory inasmuch as neither the elimination of wing breakage and the control of the blood flow resulted while the added effort and time involved offset any possible advantages.

The principal purpose of my invention is to avoid the breakage of wings during bleeding by stunning or killing the birds with electricity in apparatus in which the birds may be firmly positioned and which may be safely handled. A proper current properly applied permits the bird to be stunned so that during bleeding no movement of the wings or legs occurs with the exception of an occasional and slight flutter of the wings and with a current of intensity sufficient to affect the entire nerve system, the feathers are loosened, permitting them to be easily plucked without damaging the bird.

I prefer merely to stun the birds as they appear to bleed better, although some birds are, of course electrocuted, but in any event the humane handling of poultry in accordance with my invention not only completely eliminates any breakage, but also permits the bleeding to be effected more cleanly with the added advantage of market preparation being generally expedited. In short, all the advantages attributed to the bleeding of poultry as the proper method of killing are more completely realized by the use of my invention without any of the disadvantages resulting from any practice affecting less than all of the principal nerve centers.

Throughout the drawings and specification like reference numerals are employed to indicate corresponding parts. In the drawings I have shown embodiments of my invention indicative of essential requirements and in the drawings:—

Fig. 1 is a partly fragmentary side view of an embodiment of my invention particularly adapted for use for small poultry.

Fig. 2 is a partly fragmentary plan view of Fig. 1.

Fig. 3 is a fragmentary section along the lines 3—3, of Fig. 1.

Fig. 4 is a schematic view of the circuit used.

Fig. 5 is partly sectional side view of a modified form of my invention.

Fig. 6 is an enlarged fragmentary view showing the neck holding clip more clearly.

Fig. 7 shows a further modification of the head holding means particularly adapted for use with all poultry, and Fig. 8 is a sectional view along the lines 8—8, of Fig. 7.

As I have before indicated, my invention contemplates that all the principal nerve centers be simultaneously affected. This requires that the contact with the bird be substantially along the back bone; ideally the contacts should be at the brain and at the rump or "pope" or "parsons's" nose. The hock or knee joint is, however, more easily contacted and for that reason I feel that that point and the brain will more frequently be utilized although my apparatus permits the rump to be used as a point of contact, if desired, as when the complete loosening of the feathers is sought.

It will be appreciated that my apparatus may be used to kill or stun poultry depending on the current used and on the kind, size, and condition of the bird. As stunned birds are thought to bleed more freely, I prefer to use a current that will merely stun the majority of the birds and although some may be killed this is not a real problem as the advantages of my invention may be substantially realized when poultry is electrocuted.

In order that poultry may be firmly and safely positioned to receive the current, I have provided apparatus which is well adapted to permit the birds to be quickly and effectively handled with safety.

This apparatus is characterized by a clip 1 to receive the neck of a bird close to its head and feet holding means of which the W-shaped member 2 shown in Fig. 1, or the catch 3 shown in Fig. 5, are illustrative. Both of the members 2 and 3 are attached to a cord 4 controlled by a spring 5 to maintain the necessary tension on the bird. The catch 3 serves to hold the cord 4 after it has been wrapped around the legs of the bird.

While the cord 4 and the spring 5 may be guided and anchored in any way to permit the members 2 and 3 to depend over the clip 1, I use an upright 6 on a frame 7 as shown in Figs. 1 and 2, or on the base 8 as shown in Fig. 5, and from the upright 6, the arm 9 extends over the clip 1. The spring 5 is anchored to the upright 6 as at 10 while the cord 4 is free to run over pulleys or other suitable guides 11 on the upright 6 and the arm 9.

In the form shown in Fig. 1, the clip 1 is mounted on a box 12 on the frame 7 while in Figs. 5 and 6 the clip 1 is secured to a cross piece 13 secured to the side pieces 14.

Referring to the form of my invention shown in Figs. 1 to 4, I provide a switch 15 in control of a suitable power line 16 and from the switch 15 one wire 16a leads to a spring clip 17. As shown in Fig. 1, the wire 16a is supported as at 17a.

The other wire 16b is controlled by a switch 18 in the box 12 and extends along a lever 19 to a spike contact 20. The lever 19 is pivotally supported on a rod 21 extending between the floor 22 and the cover 23. A spring 24 permits the lever 19 to be pivoted through different planes to permit heads to be contacted when desired. The wire 16b includes a coil 16c to permit the lever 19 to be freely pivoted.

In order to ensure that the head of the bird H is in proper position, I have shown in Figs. 1 to 3 adjustable means to prevent the head from turning. A U-shaped head receiver is defined by the members 25a and 25b and the front of the box 12. The members 25a and 25b are carried by slides 26 as may be seen in Fig. 3. The slides 26 are held in slots 27 in the box 12 by bolt 28 having wing nuts 29. The head receiver may be adjusted to the sides of the heads of the birds to prevent their turning from desired position.

From the apparatus thus far described it will be seen that the birds may be held firmly in position to permit the spike 20 to contact the head of the bird in the vicinity of the brain when the operator pivots the lever 19.

A spring 30 anchored to the interior of the box 12 is attached to the blade 18a of the switch 18 and a cord 31 passing through a guide 32 connects the blade 18a and the lever 19. Thus, after the operator has placed the bird in my device, he has only to grasp the handle of the lever 19 and to carry the spike 20 against the head of the bird H and the switch 18 is closed and when the handle 19 is released, the spring 30 opens the switch 18 and returns the lever 19 to its original position.

The form shown in Fig. 5 is particularly adapted to accommodate larger birds such as the turkey T. In this form, the lever 19a is pivoted on a rod 21a between the side pieces 14 and at one end is controlled by the spring 30b secured to the upright 6 or by the treadle 33 pivoted to a cross piece 34 apertured as at 35 to receive the connecting cord 36. A cross piece 37 serves as a stop for the treadle 33. Thus when foot pressure on the treadle 33 is released, the lever 19a is controlled by the spring 30b and the spike 20 is taken out of contact with the head of the turkey.

The wire 16b includes coils 16c to allow the free movement of the lever 19a while a switch 38 in the wire 16a is within easy reach of the operator.

In Figs. 7 and 8 I have shown a modification of the head holding means adapted for use with all kinds of poultry.

The surface 39 against which the bird's head is to be held is slotted as at 40 to receive the edge of the neck contacting pieces 41 which, as shown in Fig. 8, are slidably confined therein as shown at 42 in Fig. 8.

Side pieces 43 are secured to the neck pieces 41 to contact the sides of the bird's head. The side pieces 43 are formed with arms 43a extending into the slots 40. A spring 44 anchored as at 45 urges each of the side pieces towards each other so that the head and neck of any bird may be forced between them and held securely.

There are few additional factors that need to be considered. The current used will depend on available sources. For smaller poultry the usual household current is satisfactory while for turkeys a current of 220 volts is preferable. If my invention is to be used to maximum advantage including the relaxation of the feather muscles, a spark coil of sufficient intensity to ensure complete destruction of the nervous system is used. The operation of my device is extremely simple and effective and with little practice the operator will be able to pierce at least the skin of the head at desirable places to ensure proper contact.

In accordance with my invention birds may be rapidly handled and properly stunned to eliminate wing breakage and to control the bleeding.

What I therefore claim and desire to secure by Letters Patent is:—

1. Apparatus for use in stunning or killing poultry by electricity, comprising a support, means on said support to hold the head of a bird in a desired position, means to hold the feet of said bird, a lever pivotally mounted on said support to be swung toward said head, and an electric circuit, said circuit including a contact adapted to be attached to said bird, and a spike, said spike being mounted on said lever to contact said head on proper movement of said lever.

2. Apparatus for use in stunning or killing poultry by electricity, comprising a support, means on said support to hold the head of a bird in a desired position, means to hold the feet of said bird, a lever pivotally mounted on said support to be swung toward said head, and an electric circuit, said circuit including a contact adapted to be attached to said bird, a spike, said spike being mounted on said lever to contact said head on proper movement of said lever, and a switch, and means normally holding said switch open and said lever remote from said bird.

3. Apparatus for use in stunning or killing poultry by electricity, comprising a support, means on said support to hold the head of a bird in a desired position, means to hold the feet of said bird, a lever pivotally mounted on said support to be swung toward said head, an electric circuit, said circuit including a contact adapted to be attached to said bird, a spike, said spike being mounted on said lever to contact said head on proper movement of said lever, and a switch, and means normally holding said switch open and said lever remote from said bird, said means including a spring in control of said switch and said lever.

4. Apparatus for use in stunning or killing poultry by electricity, comprising a support, means on said support to hold the head of a bird in a desired position, said means comprising a clip adapted to partially encircle the neck of said bird and to prevent the passage of its head therethrough, means to hold the feet of said bird, a lever pivotally mounted on said support to be swung toward said head, and an electric circuit, said circuit including a contact adapted to be attached to said bird, and a spike, said spike being mounted on said lever to contact said head on proper movement of said lever.

5. Apparatus for use in stunning or killing poultry by electricity, comprising a support, means on said support to hold the head of a bird in a desired position, said means comprising a clip adapted to partially encircle the neck of said bird and to prevent the passage of its head therethrough, and laterally adjustable members adapted to hold the head of said bird from turning, means to hold the feet of said bird, a lever pivotally mounted on said support to be swung toward said head, and an electric circuit, said circuit including a contact adapted to be attached to said bird, and a spike, said spike being mounted on said lever to contact said head on proper movement of said lever.

6. Apparatus for use in stunning or killing poultry by electricity, comprising a support, means on said support to hold the head of a bird in a desired position, said means including slidable members adapted to hold the neck of said bird and to bear against the sides of its head and springs urging said members together, means to hold the feet of said bird, a lever pivotally mounted on said support to be swung toward said head, and an electric circuit, said circuit including a contact adapted to be attached to said bird, and a spike, said spike being mounted on said lever to contact said head on proper movement of said lever.

7. Apparatus for use in stunning or killing poultry by electricity, comprising a support, means on said support to hold the head of a bird in a desired position, said means comprising a clip adapted to partially encircle the neck of said bird and to prevent the passage of its head therethrough, means to hold the feet of said bird, a lever pivotally mounted on said support to be swung toward said head, said lever being vertically adjustable to pivot through different planes, and an electric circuit, said circuit including a contact adapted to be attached to said bird, and a spike, said spike being mounted on said lever to contact said head on proper movement of said lever.

8. In apparatus for use in stunning or killing poultry by electricity, means to hold the head of a bird in a desired position, means to hold the feet of said bird, said means including a spring adapted to maintain a desired tension on said means to hold said bird tightly when its head is held in said first-named means, a lever mounted to be swung toward said head, and an electric circuit, said circuit including a contact adapted to be attached to said bird, and a spike, said spike being mounted on said lever to contact said head on proper movement of said lever.

9. In apparatus for use in stunning or killing poultry by electricity, a support, means on said support to hold the head of a bird in desired position, means to hold the feet of said bird, and an electric circuit with one of its poles contacting the foot holding means and a movable pole whereby a second contact may be made with another desired part of said bird to complete the circuit and to stun said bird.

10. In apparatus for use in stunning or killing poultry by electricity, a support, means on said support to hold the head of a bird in desired position, resilient means to hold the feet of said bird, and an electric circuit with one of its poles contacting one of said holding means and a movable pole whereby a second contact may be made with another desired part of said bird to complete the circuit and to stun said bird.

11. In the preparation of live poultry for table use, those steps consisting in producing at least temporary paralysis by electric shock of the partially independent principal nerve centers such as the brain, the brachial plexus and sacral plexus in anticipation of convulsions during bleeding, and in opening the jugular vein to drain the circulatory system.

12. In the preparation of live poultry for table use, that step consisting of producing at least a temporary paralysis of principal nerve centers by shock from electric current applied substantially at the brain center and the sacral plexus.

13. In the preparation of live poultry for table use, those steps consisting in producing a temporary paralysis of the nerve centers of a bird including the motor centers of its wings by inflicting a shock from an electric current applied by one pole in cerebral proximity and with another pole at an extremity for a period of time insufficient to cause death by electrocution, and in opening its circulatory system to draw off the blood.

14. In the preparation of live poultry for table use, those steps consisting in destroying the nervous system of a bird including the motor centers of its wings and legs by inflicting a shock from an electric current applied by one pole in cerebral proximity and with another pole at an extremity, and in opening its circulatory system to draw off the blood.

15. In the preparation of live poultry for table use, those steps consisting in producing a temporary paralysis of the nerve centers of a bird including the motor centers of its wings and legs by inflicting a shock from an electric current applied by one pole in cerebral proximity and with another pole at the rump for a period of time insufficient to cause death by electrocution.

16. In the preparation of live poultry for table use, those steps consisting in producing a temporary paralysis of the nerve centers of a bird including the motor centers of its wings and legs by inflicting a shock from an electric current applied by one pole in cerebral proximity and with another pole at an extremity, said shock being effective to produce complete muscular relaxation, in severing the jugular vein to open its circulatory system to draw off the blood, and in plucking the loosened feathers.

17. In apparatus for stunning or killing poultry by electricity, a support, means thereon for holding the bird in desired position, and an electric circuit having one pole adapted to be attached to a desired part of the bird and a second pole adapted to contact the head of the bird to complete the circuit through the body of the bird.

18. In apparatus for stunning or killing poultry by electricity, a support, means thereon for holding the bird in desired position, and an electric circuit having one pole adapted to be attached to a desired part of the bird, and a second pole, and means adapted to carry said second pole to contact the head of the bird to complete the circuit through the body of the bird.

19. In apparatus for stunning or killing poultry by electricity, a support, means thereon for holding the bird in desired position, and an electric circuit having one pole adapted to be attached to a desired part of the bird and a second pole, a lever mounted on said support, said second pole being mounted on said lever, and means for moving said lever to bring said pole into contact with the head of the bird.

20. In apparatus for stunning or killing poultry by electricity, a support, means thereon for holding the bird in desired position, and an electric circuit having one pole adapted to be attached to a desired part of the bird and a second pole including a spike, and means for moving said spike to position to contact the head of the bird.

21. In the preparation of poultry for market those steps consisting in applying electric contacts to selected nerve centers of the bird and in passing an electric current through the body of the bird of sufficient voltage to stun the bird and to cause muscular relaxation to loosen its feathers.

22. In the preparation of poultry for market those steps consisting in producing a paralysis of the nerve centers of a bird by inflicting a shock from an electric current applied by one pole in cerebral proximity and another pole at another selected point, said shock being effective to produce sufficient muscular relaxation to loosen the feathers of the bird.

23. Apparatus for use in stunning or killing poultry by electricity, a support, means on said support to hold the head of a bird, a lever pivotally mounted on said support to be swung toward said head and an electric circuit, said circuit including a contact adapted to be attached to said bird and a spike, said spike being mounted on said lever to contact said head confined in said head holding means on proper movement of said lever.

24. Apparatus for use in stunning or killing poultry by electricity, a support, means on said support to hold the head of a bird, a lever pivotally mounted on said support to be swung toward said head and an electric circuit, said circuit including a contact adapted to be attached to said bird a spike, said spike being mounted on said lever to contact said head confined in said head holding means on proper movement of said lever, and a switch, and means normally holding said switch open and said lever remote from said head holding means.

25. In apparatus for use in stunning or killing poultry by electricity, a support, means on said support to hold the head of a bird, resilient means to hold the feet of said bird, and an electric circuit, said circuit including a contact adapted to be attached to said bird and a contact adapted to be held against the head of said bird.

26. In apparatus for use in stunning or killing poultry by electricity, a support, adjustable means on said support to hold the head of a bird, resilient means to hold the feet of said bird, and an electric circuit, said circuit including a contact adapted to be attached to said bird and a contact adapted to be held against the head of said bird.

27. In apparatus for use in stunning or killing poultry by electricity, a support, means on said support to receive the head of a bird and an electric circuit, said circuit including a contact adapted to be attached to said bird and a contact adapted to be held against the head of said bird.

28. In the preparation of poultry for market, those steps preparatory to bleeding and plucking that consist of attaching one contact of an electric current to the caudal extremity of a bird and then placing the other contact against the head to close the circuit to effect the cranial, brachial, and sacral plexus to produce paralysis or death depending on whether bleeding or plucking is to be facilitated.

29. In the preparation of poultry for market, those steps preparatory to bleeding and plucking that consist of attaching one contact of an electric circuit to the leg of a bird above the knee joint and then placing the other contact against the head to close the circuit to effect the cranial, brachial, and sacral plexus to produce paralysis or death depending on whether bleeding or plucking is to be facilitated.

30. In the preparation of poultry for market, those steps preparatory to bleeding and plucking that consist of holding the head of the bird and attaching one contact of an electric circuit to a bird and then placing the other contact against the head to close the circuit, said first named contact being positioned so that said circuit will effect the cranial, brachial, and sacral plexus to produce paralysis or death depending on whether bleeding or plucking is to be facilitated.

31. In the preparation of poultry for market, those steps preparatory to bleeding and plucking that consist of holding the bird by the feet and attaching one contact of an electric circuit to a bird and then placing the other contact against the head to close the circuit, said first contact being positioned so that said circuit will effect the cranial, brachial, and sacral plexus to produce paralysis or death depending on whether bleeding or plucking is to be facilitated.

WILBER V. HUNT.

DISCLAIMER 2,103,288.—*Wilber V. Hunt*, North Acton, Mass. METHOD AND APPARATUS FOR KILLING POULTRY. Patent dated December 28, 1937. Disclaimer filed September 30, 1938, by the patentee.

Hereby enters this disclaimer to claim 17 in said specification.

[*Official Gazette October 25, 1938.*]

tion, in severing the jugular vein to open its circulatory system to draw off the blood, and in plucking the loosened feathers.

17. In apparatus for stunning or killing poultry by electricity, a support, means thereon for holding the bird in desired position, and an electric circuit having one pole adapted to be attached to a desired part of the bird and a second pole adapted to contact the head of the bird to complete the circuit through the body of the bird.

18. In apparatus for stunning or killing poultry by electricity, a support, means thereon for holding the bird in desired position, and an electric circuit having one pole adapted to be attached to a desired part of the bird, and a second pole, and means adapted to carry said second pole to contact the head of the bird to complete the circuit through the body of the bird.

19. In apparatus for stunning or killing poultry by electricity, a support, means thereon for holding the bird in desired position, and an electric circuit having one pole adapted to be attached to a desired part of the bird and a second pole, a lever mounted on said support, said second pole being mounted on said lever, and means for moving said lever to bring said pole into contact with the head of the bird.

20. In apparatus for stunning or killing poultry by electricity, a support, means thereon for holding the bird in desired position, and an electric circuit having one pole adapted to be attached to a desired part of the bird and a second pole including a spike, and means for moving said spike to position to contact the head of the bird.

21. In the preparation of poultry for market those steps consisting in applying electric contacts to selected nerve centers of the bird and in passing an electric current through the body of the bird of sufficient voltage to stun the bird and to cause muscular relaxation to loosen its feathers.

22. In the preparation of poultry for market those steps consisting in producing a paralysis of the nerve centers of a bird by inflicting a shock from an electric current applied by one pole in cerebral proximity and another pole at another selected point, said shock being effective to produce sufficient muscular relaxation to loosen the feathers of the bird.

23. Apparatus for use in stunning or killing poultry by electricity, a support, means on said support to hold the head of a bird, a lever pivotally mounted on said support to be swung toward said head and an electric circuit, said circuit including a contact adapted to be attached to said bird and a spike, said spike being mounted on said lever to contact said head confined in said head holding means on proper movement of said lever.

24. Apparatus for use in stunning or killing poultry by electricity, a support, means on said support to hold the head of a bird, a lever pivotally mounted on said support to be swung toward said head and an electric circuit, said circuit including a contact adapted to be attached to said bird a spike, said spike being mounted on said lever to contact said head confined in said head holding means on proper movement of said lever, and a switch, and means normally holding said switch open and said lever remote from said head holding means.

25. In apparatus for use in stunning or killing poultry by electricity, a support, means on said support to hold the head of a bird, resilient means to hold the feet of said bird, and an electric circuit, said circuit including a contact adapted to be attached to said bird and a contact adapted to be held against the head of said bird.

26. In apparatus for use in stunning or killing poultry by electricity, a support, adjustable means on said support to hold the head of a bird, resilient means to hold the feet of said bird, and an electric circuit, said circuit including a contact adapted to be attached to said bird and a contact adapted to be held against the head of said bird.

27. In apparatus for use in stunning or killing poultry by electricity, a support, means on said support to receive the head of a bird and an electric circuit, said circuit including a contact adapted to be attached to said bird and a contact adapted to be held against the head of said bird.

28. In the preparation of poultry for market, those steps preparatory to bleeding and plucking that consist of attaching one contact of an electric current to the caudal extremity of a bird and then placing the other contact against the head to close the circuit to effect the cranial, brachial, and sacral plexus to produce paralysis or death depending on whether bleeding or plucking is to be facilitated.

29. In the preparation of poultry for market, those steps preparatory to bleeding and plucking that consist of attaching one contact of an electric circuit to the leg of a bird above the knee joint and then placing the other contact against the head to close the circuit to effect the cranial, brachial, and sacral plexus to produce paralysis or death depending on whether bleeding or plucking is to be facilitated.

30. In the preparation of poultry for market, those steps preparatory to bleeding and plucking that consist of holding the head of the bird and attaching one contact of an electric circuit to a bird and then placing the other contact against the head to close the circuit, said first named contact being positioned so that said circuit will effect the cranial, brachial, and sacral plexus to produce paralysis or death depending on whether bleeding or plucking is to be facilitated.

31. In the preparation of poultry for market, those steps preparatory to bleeding and plucking that consist of holding the bird by the feet and attaching one contact of an electric circuit to a bird and then placing the other contact against the head to close the circuit, said first contact being positioned so that said circuit will effect the cranial, brachial, and sacral plexus to produce paralysis or death depending on whether bleeding or plucking is to be facilitated.

WILBER V. HUNT.

DISCLAIMER 2,103,288.—*Wilber V. Hunt*, North Acton, Mass. METHOD AND APPARATUS FOR KILLING POULTRY. Patent dated December 28, 1937. Disclaimer filed September 30, 1938, by the patentee.

Hereby enters this disclaimer to claim 17 in said specification.

[*Official Gazette October 25, 1938.*]

DISCLAIMER 2,103,288.—*Wilber V. Hunt*, North Acton, Mass. METHOD AND APPARATUS FOR KILLING POULTRY. Patent dated December 28, 1937. Disclaimer filed September 30, 1938, by the patentee.

Hereby enters this disclaimer to claim 17 in said specification.

[*Official Gazette October 25, 1938.*]